United States Patent

Gloriod et al.

[11] 3,969,332
[45] July 13, 1976

[54] POLYMERIZATION OF ETHYLENE

[75] Inventors: Pierre Gloriod, Bully-les-Mines; Bernard Levresse, Lillebonne; Jean-Pierre Machon, Bethune, all of France

[73] Assignee: Ethylene Plastique, Courbevoie, France

[22] Filed: Aug. 20, 1974

[21] Appl. No.: 499,106

[30] Foreign Application Priority Data

Aug. 21, 1973  France .............................. 73.30328

[52] U.S. Cl. ............................. 526/128; 252/429 A; 526/352
[51] Int. Cl.² ..................... C08F 4/66; C08F 10/02
[58] Field of Search ......... 260/88.2, 94.9 B, 94.9 C, 260/94.9 E

[56] References Cited
UNITED STATES PATENTS

| | | |
|---|---|---|
| 3,642,748 | 2/1972 | Iwasaki et al. ................ 260/94.9 DA |
| 3,723,403 | 3/1973 | Greaves et al. ................ 260/94.9 B |
| 3,755,274 | 8/1973 | Piekarski et al. .............. 260/94.9 C |

FOREIGN PATENTS OR APPLICATIONS 4,520,110   7/1970   Japan .............................. 260/94.9 B Primary Examiner—Edward J. Smith

[57] ABSTRACT

A method for the polymerization or copolymerization of ethylene comprising polymerizing the ethylene at a pressure greater than 500 bars, at a temperature in the range 160° to 280°C and under conditions in which polymerization takes place in a single liquid phase, in the presence of a catalyst system comprising A. an alkylsiloxalane derivative of the formula,

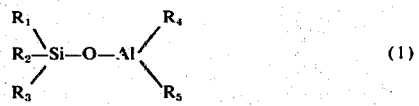

(1)

and

B. a halogenated titanium compound of the titanium trichloride type, the Al/Ti ratio between the constituents being between 1 and 10.

6 Claims, No Drawings

POLYMERIZATION OF ETHYLENE

The present invention relates to a new method for the polymerisation of ethylene at high pressure.

The polymerisation of ethylene at high pressure, initiated by a radical catalyst, for example peroxide, has been known and used industrially for many years.

Furthermore, it is known to polymerise ethylene at a low pressure, by using a catalyst of the Ziegler type formed for example by titanium trichloride and an aluminium alkyl or obtained by the reaction of titanium tetrachloride on an aluminium alkyl.

It has also been recommended to use these same "Ziegler" catalysts for polymerising ethylene at high pressure and at a high temperature, i.e. under conditions similar to those used in the radical method of polymerising ethylene. But this use of conventionally known Ziegler catalysts, at high pressure and high temperature, causes a certain number of problems of technical or technological nature. These problems are linked more especially with the relative instability of the aluminium alkyl (which leads to the development of reactions known as "parasite" reactions) and with the dangers inherent in a recirculation of gas containing residues of catalysts.

Thus, for the polymerisation of ethylene at high pressure and high temperature according to known techniques, it is thus desirable to have a new catalytic system of the Ziegler type, which does not have the drawbacks of conventional Ziegler catalytic systems. Polymerisation of ethylene at high pressure and high temperature is intended to mean polymerisation taking place at a temperature of between 160° and 280°C and a pressure greater than 500 bars, these operating conditions, known per se, allowing the polymerisation reaction to take place under the best possible physical/chemical conditions, i.e. with a single liquid phase in the reactor.

Now any catalyst of the Ziegler type cannot be necessarily used at high pressure and high temperature. In fact, Ziegler catalysts are constituted by a derivative of a transition metal (for example $TiCl_3$) and an activator (for example aluminium alkyl) between which beneficial or harmful interactions develop, depending on the experimental conditions. It is impossible to reliably produce these interactions and thus the activity of the Ziegler catalysts in extreme conditions of polymerisation.

The catalytic system used according to the present invention is characterised in that it comprises, A. an alkylsiloxalane derivative of the formula (1)

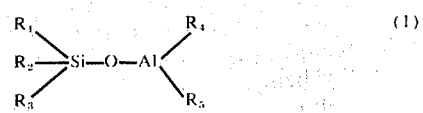

and

B. a halogenated titanium compound of the titanium trichloride type, the Al/Ti ratio of the alkylsiloxalane to the halogenated titanium compound being between 1 and 10 and preferably between 1 and 5.

The alkylsiloxalane derivative used according to the invention has the above formula (1) and is such that the radicals $R_1$, $R_2$, $R_3$ and $R_4$ are saturated hydrocarbon radicals comprising from 1 to 10 carbon atoms. The radical $R_5$ may also be a saturated hydrocarbon radical having from 1 to 10 carbon atoms; but $R_5$ may also be a radical of the type

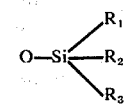

and more generally the alkylsiloxalane may have a polymeric form if a polysiloxane is used as a starting product for preparing this alkylsiloxalane. In all these alkylsiloxalanes, the Si/Al ratio is equal to or greater than 1 or equal to or less than 3.

The alkylsiloxalanes which may be used according to the invention may be prepared essentially by using one of the following chemical reactions:

action of a trialkylsilanol on an aluminium trialkyl; for example

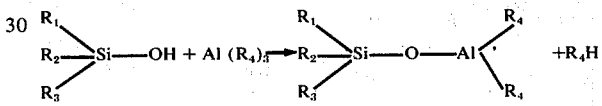

action of a cyclic siloxane on an aluminium trialkyl, for example

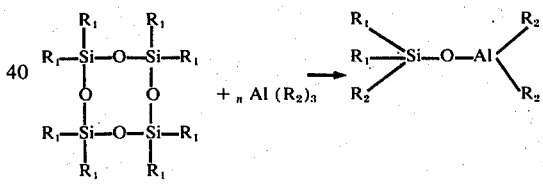

action of a polysiloxane (of the silicone oil type) on an aluminium trialkyl; for example

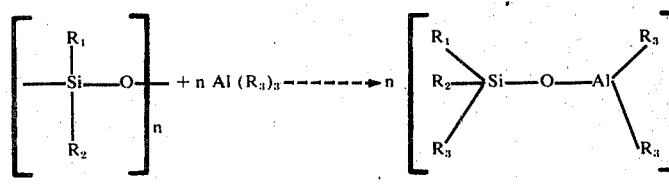

The halogenated titanium compound is of the titanium trichloride type; a product of this type is known; its exact chemical formula may vary according to its conditions of preparation. The titanium trichloride may be of $\alpha, \beta, \gamma$ or $\delta$ form; it may contain other compounds such as $TiCl_2 - AlCl_3$; it may be used in the form of a grain or distributed on a support. Thus, it may contain aluminium trichloride in a syncrystallised form or may be in various crystalline forms. Of the methods of preparing this halogenated titanium compound, the following non-limiting methods will be mentioned:

the reduction of $TiCl_4$ by metallic aluminium, hydrogen or an alloy of aluminium and magnesium, the reduction of TiCl₄ by aluminium in the presence of MgCl₂, MgO or Mg(OR)₂ the reduction of TiCl₄ by an aluminium alkyl.

The reaction takes place in a polymerisation reactor at a pressure greater than 500 bars and preferably greater than 1000 bars; this reaction must take place in conditions where there is a single liquid phase in the reactor, which implies either the use of a sufficient temperature, or the addition, to the polymerisation medium, of inert solvents. The temperature to be used is generally between 160° and 280°C.

Although the polymerisation may be carried out in the various types of reactor currently used for polymerising ethylene by the high pressure method, it is preferable to undertake this polymerisation in a reactor of the agitated autoclave type, in which the average residence time of the catalyst could be regulated between approximately 5 and 60 seconds.

The use of a catalyst according to the invention leads to a certain number of advantages, which may be summarised as follows:

with respect to the use of a radical catalyst, polyethylenes are obtained having different densities and different distributions of molecular mass, with respect to the use of a known catalyst of the Ziegler type, one obtains an improved catalytic yield (this seems to be due to the greater stability of the catalyst according to the invention), a polymer whose chlorine content coming from the catalyst is less, a polyethylene whose distribution of molecular masses may be very close (this distribution is very close if the operating conditions are the same throughout the entire reactor but, as known, it is possible to vary the temperature in the reactor and/or to use several regions in said reactor; finally, owing to the use of alkylsiloxalanes in place of aluminium alkyls, the presence of the latter in the recycling gas is eliminated. It will be noted that according to the present invention, it is possible to copolymerise ethylene with other polymerisable olefinic monomers with catalysts of the Ziegler type. In particular, it is possible to copolymerise ethylene with alphaolefines. In the present application, the expression "polymerisation of ethylene" is thus not limited to the homopolymerisation of ethylene, but should be understood to mean the homopolymerisation and copolymerisation of ethylene with copolymerisable monomers.

The following non-limiting examples illustrate the invention; the preparation of alkylsiloxalanes which may be used according to the invention will firstly be described, then, the results obtained from polymerisation of ethylene at high pressure will be given in the tables.

EXAMPLE 1

Preparation of trimethyl diethylsiloxalane. The trimethyl diethylsiloxalane of formula

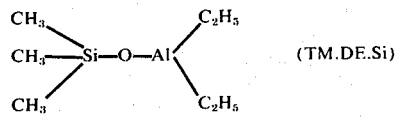

(TM.DE.Si)

was prepared by the reaction of trimethylsilanol on aluminium triethyl.

Under an inert atmosphere, 0.5l of a heptanic solution at 1 mole/liter of aluminium triethyl was introduced into a two liter flask provided with an agitator, an inlet tube and a reflux condenser. 0.5 moles of trimethylsilanol in a heptanic solution was introduced in one hour through the inlet tube. The reaction temperature was 50°C. A solution of trimethyl diethylsiloxalane was thus obtained in the heptane.

Other derivatives of siloxalane are prepared in the same manner by replacing the aluminium triethyl by other aluminium trialkyls.

The following were thus obtained:

| Aluminium alkyl | siloxalane |
|---|---|
| aluminium trimethyl | trimethyl dimethylsiloxalane (TM.DM.Si) |
| aluminium tri-n-butyl | trimethyl di-n-butyl-siloxalane (TM.DnB Si) |
| aluminium tri-isobutyl | trimethyl di-iso-butyl siloxalane(TM.Dib.Si) |
| aluminium tri-n-octyl | trimethyl di-octyl siloxalane (TM.DO.Si) |

EXAMPLE 2

Preparation of dimethylethyl diethyl siloxalane. The dimethylethyl diethyl siloxalane of formula:

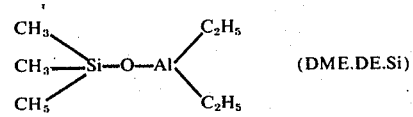

(DME.DE.Si)

was prepared in a laboratory apparatus as described in example 1, by reacting 1 mole of octamethylcyclotetrasiloxane with 4 moles of aluminium triethyl at 50° for 1 hour.

A heptanic solution of this product was obtained.

If in the above-described reaction, 0.5 moles of aluminium triethyl are used for 1 mole of octamethylcyclotetrasiloxane, a siloxalane is obtained whose Al/Si ratio is equal to approximately one-half and the formula of which seems to be

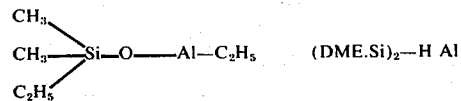

(DME.Si)₂—H Al

To carry out the polymerisations of ethylene according to the invention, it is sufficient to introduce into the reactor, ethylene, siloxalane and titanium halide. However, it is generally preferable to introduce the siloxalane and titanium halide in the form of a catalytic suspension ready for use, simultaneously into the reactor. This suspension contains the constituents of the catalyst in the desired proportions (which eliminates any difficulty as regards the quantities introduced) and makes it possible to "activate" the titanium halide by the siloxalane, under the best conditions. In addition, it is possible to modify the physical aspect of this suspension by undertaking, in known manner, pre-polymerisation. It is this operation which is described in example 3.

EXAMPLE 3

Preparation of a catalytic suspension.

A 50mM/liter suspension of TiCl₃ ⅓ AlCl₃ in heptane is prepared. Added to this solution is a solution of trimethyldiethylsiloxalane in such quantity that the Al/Ti ratio is equal to 1. Then one adds hex-1-ene to the medium in a quantity such that the hexene/titanium trichloride molar ratio is equal to 5. A suspension is obtained which is very fine, may be easily pumped and may be diluted in heptane in order to obtain a suspension containing 5mM/liter of titanium compound. A quantity of trimethyldiethylsiloxalane is then added to this suspension such that the Al/Ti ratio is equal to 3.

This example may be repeated with various siloxalanes and various titanium trichloride derivatives.

EXAMPLE 4

Polymerisation of ethylene.

Polymerisations of ethylene were undertaken at 1600 bars, using catalytic suspensions prepared as in example 3.

In the tests, the following were varied:

The experimental conditions of the various tests and the results obtained are illustrated in the accompanying table; it will be noted that in these tests the desired index of fluidity of the polyethylene was regulated by use of hydrogen as a transfer agent in an amount of from 0.1 to 0.5%, in moles, with respect to ethylene.

By way of comparison, tests 1 and 2 were reproduced, replacing the siloxalane by an aluminium alkyl (monochlorodiethyl aluminium) or aluminium trimethyl or aluminium triethyl or aluminium tributyl); in all these cases, a polyethylene was obtained whose index of polydispersity (Mw/Mn) is higher (of the order of 8) and which contains more low molecular masses (B being of the order of 12).

TABLE

| Test | Siloxalane | Al/Ti | TiCl$_3$ | Temperature (°C) | Time of passage (S) | Catalytic Yield (R) | Volumetric Mass (MV) | Index of fluidity (IF) | Mw/Mn | B |
|---|---|---|---|---|---|---|---|---|---|---|
| 1 | TM.DM.Si | 3 | TiCl$_3$ 1/3 AlCl$_3$ | 240 | 35 | 2.3 | 0.961 | 2.0 | 3.5 | 4 |
| 2 | TM.DE.Si | 3 | TiCl$_3$ 1/3 AlCl$_3$ | 240 | 35 | 2.7 | 0.963 | 5.8 | 2.8 | 2.3 |
| 3 | TM.DE.Si | 10 | TiCl$_3$ 1/3 AlCl$_3$ | 240 | 42 | 2.0 | 0.955 | 17 | 4 | 11.6 |
| 4 | TM.DE.Si | 3 | TiCl$_3$ 1/3 AlCl$_3$ | 230 | 90 | 3.1 | 0.963 | 3.2 | 3.6 | — |
| 5 | DME.DE.Si | 3 | TiCl$_3$ 1/3 AlCl$_3$ | 220 | 30 | 3.8 | 0.966 | 1.8 | 3.6 | — |
| 6 | DME.DE.Si | 3 | TiCl$_3$ 1/3 AlCl$_3$ | 240 | 30.5 | 3.6 | 0.962 | 1.4 | 4.7 | 6.5 |
| 7 | DME.DE.Si | 3 | TiCl$_3$ 1/3 AlCl$_3$ | 260 | 29 | 2.1 | 0.960 | 26.4 | 3.8 | 9 |
| 8 | TM.DE.Si | 3 | TiCl$_3$ (H) | 240 | 28 | 1.8 | 0.963 | 3.8 | 3.6 | 9 |
| 9 | TM.DE.Si | 3 | TiCl$_4$-Mg(OEt)$_2$ | 240 | 33 | 2.5 | 0.964 | 0.3 | 4 | 6.4 |
| 10 | DME.DE.Si | 3 | TiCl$_3$ (Al-Mg) | 240 | 31 | 3 | 0.960 | 0.4 | 3.7 | 7 |
| 11 | DME.DE.Si | 3 | TiCl$_3$ 1/3 AlCl$_3$ Mg(OC$_2$H$_5$)$_2$ | 240 | 31 | 2.4 | 0.961 | 0.4 | 3.9 | 7.9 |
| 12 | TM.DnB.Si | 3 | TiCl$_3$ 1/3 AlCl$_3$ | 240 | 31.5 | 2.9 | 0.959 | 0.4 | 2.8 | 7.8 |
| 11 | TM.DiB.Si | 3 | TiCl$_3$ 1/3 AlCl$_3$ | 240 | 32 | 2.6 | 0.957 | 0.4 | 3.3 | 8.8 |
| 14 | TM.DO.Si | 3 | TiCl$_3$ 1/3 AlCl$_3$ | 240 | 31 | 2.6 | 0.959 | 0.4 | 4.9 | 8.3 |
| 16 | (DMESi)$_2$-EAl | 3 | TiCl$_3$ 1/3 AlCl$_3$ | 240 | 33 | 3.8 | 0.962 | 1 | — | — | the type of reactor; an agitated reactor was used; it was proved that the method according to the invention could be carried out in a tubular reactor, the reaction temperatures, the constituents of the catalyst; the various titanium trichlorides used are:

TiCl$_3$ 1/3 AlCl$_3$: this is a known commercial product used very widely for catalysts of the Ziegler type.

TiCl$_3$ (H): this is a product obtained by the reduction of TiCl$_4$ by hydrogen and then crushed.

TiCl$_4$-Mg (O Et)$_2$: this is a TiCl$_3$ obtained by reaction at 130°C, from TiCl$_4$ by magnesium ethylate (the reaction may be carried out in known manner by using 150ml of TiCl$_4$ and 37g of magnesium ethylate.

TiCl$_3$-(Al-Mg): this is a TiCl$_3$ obtained by reduction of TiCl$_4$ by a mixture of aluminium and magnesium; a reaction of this type is known.

TiCl$_3$ 1/3 AlCl$_3$: Mg (OC$_2$H$_5$)$_2$: this is a solid obtained by grinding one mole of TiCl$_3$ 1/3 AlCl$_3$ with one mole of Mg (OC$_2$H$_5$)$_2$.

the average residence time (in seconds) of the ethylene in the reactor. The results obtained are characterised by the following data:

the catalytic yield (R) which is expressed in kg of polyethylene obtained per milliatom of titanium contained in the catalyst used.

the volumetric mass (MV) of polyethylene expressed in g/cm$^3$; it is measured at 20°C on products having undergone re-heating for one hour at 150°C and cooling at a speed of 50°C per hour, the index of fluidity (IF), measured according to the ASTM 1238-62T standard at a temperature of 190°C and with a weight of 2.16kg, the index of polydispersity (mw/Mn), the rate of low masses (B) which is the percentage by weight of polyethylene having a molecular mass less than 5,000.

What is claimed is:

1. A method for the polymerization or copolymerization of ethylene comprising polymerizing the ethylene at a pressure greater than 500 bars, at a temperature within the range from 160° to 280°C and under conditions in which polymerization takes place in a single liquid phase, in the presence of a catalyst system comprising A. an alkylsiloxalane derivative of the formula:

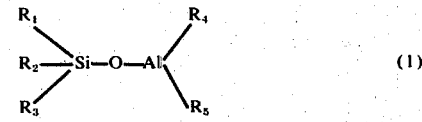

(1)

wherein

R$_1$, R$_2$, R$_3$ and R$_4$ are each selected from the group consisting of hydrocarbon radicals having from one to ten carbon atoms, and R$_5$ is

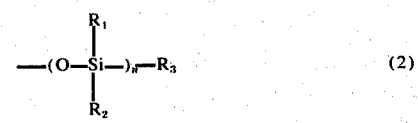

(2)

wherein

R$_1$, R$_2$ and R$_3$ are selected from the group consisting of hydrocarbon radicals having from 1 to 10 carbon atoms;

the Si:Al ratio in the alkyl siloxalane being within the range from one to three; and B. a titanium trichloride; the constituents A and B being taken in amounts to give an Al/Ti ratio between 1 and 10.

2. A method according to claim 1 wherein the Al/Ti ratio is between 1 and 5.

3. Method according to claim 1, characterised in that the residence time of the catalyst in the polymerisation reactor is between 1 and 100 seconds.

4. Method according to claim 1 in which the titanium trichloride is of the $\alpha$-, $\beta$-, $\gamma$-, or $\delta$- form.

5. Method according to claim 1, in which the titanium trichloride contains aluminum trichloride in a cocrystallised form.

6. Method according to claim 1, in which the titanium trichloride contains $TiCl_2-AlCl_3$.

* * * * *